June 18, 1968  B. E. KEVELIN ET AL  3,388,945
DIELECTRIC BONDING OF CONVERTIBLE TOP DECK MATERIAL TO GLASS
Filed Aug. 23, 1965

INVENTORS
Bruce E. Kevelin, &
Ralph M. Stallard

Peter P. Kozak
ATTORNEY

United States Patent Office 3,388,945
Patented June 18, 1968

3,388,945
DIELECTRIC BONDING OF CONVERTIBLE TOP DECK MATERIAL TO GLASS
Bruce E. Kevelin, Warren, and Ralph M. Stallard, Rochester, Mich., assignors to General Motors Corporation, Detroit, Mich., a corporation of Delaware
Filed Aug. 23, 1965 Ser. No. 481,791
6 Claims. (Cl. 296—145)

ABSTRACT OF THE DISCLOSURE

Vinyl plastic automobile convertible top material is bonded to sheet glass to form a window by applying uncured polyalkylene polysulfide rubber composition to an edge of one side of the glass sheet, curing the composition to form a tough, resilient rubber layer strongly adhering to said glass, trimming the rubber, if necessary, to a layer of desired uniform thickness, abrading the exposed surface of the rubber to form crevices therein, applying a solution of an unplasticized low molecular weight resin such as polyvinyl chloride which is compatible with vinyl polymers to the abraded rubber surface thereby filling the crevices, evaporating the solvent, assembling the vinyl top material against the coated abraded rubber surface under pressure and heating the assembly whereby the vinyl compatible resin fuses with the vinyl material to provide a substantially mechanical bond between the vinyl top and the polysulfide rubber.

---

This invention relates to automobile convertible tops and more particularly to a means of bonding glass rear windows to vinyl plastic convertible top material.

For about the past 20 years it has been the practice to use clear vinyl plastic back windows on convertible style automobiles. This plastic window replaced a smaller glass window which was installed by securing the glass to the top material with a two-piece metal retainer frame. These plastic windows, while providing for a greater area of visibility, have been susceptible to scratching and discoloration. Thus, it would be desirable to substitute a glass window of comparable size for the plastic window. However, the weight of the large glass window and the metal retainer have caused excessive and unacceptable sagging of the top material.

Accordingly, it is an object of this invention to provide a lightweight means for installing a glass window in a fabric convertible top. It is a more specific object of this invention to provide a method of bonding convertible type material having a polyvinyl chloride facing layer to glass rear windows. It is a further object of this invention to provide a convertible top comprised of a vinyl coated facing material and a glass rear window which are bonded together by means of a polysulfide rubber and a resin compatible with vinyl polymers. In this convertible top the cured polysulfide rubber is bonded to the glass and the vinyl compatible resin is attached to the polysulfide rubber in a substantially mechanical bond and to the vinyl facing material in a substantially chemical bond.

These and other objects are accomplished by applying a suitable polyalkylene polysulfide formulation containing a catalyst or curing agent to a clean glass surface, curing the polysulfide to a tough rubber consistency, and trimming the rubber surface, if necessary, to a layer of desired uniform thickness. Thereafter the rubber surface is mechanically abraded whereby crevices or interstices are formed irregular in cross section but which have undercut sides. A solution of a suitable unplasticized low molecular weight resin compatible with vinyl polymers is applied to the abraded rubber surface filling the undercut crevices and interstices. Subsequently, the solvent is removed by evaporation to leave a residue of vinyl compatible resin in the rubber surface. The vinyl coated top material is assembled against the abraded rubber surface with its vinyl facing against the vinyl compatible resin coated rubber surface and the vinyl top is bound to the vinyl compatible resin in the polysulfide rubber surface by the application of heat and pressure.

Other objects and advantages will be observed from the following detailed description, reference being had to the accompanying drawings wherein preferred embodiments of the present invention are clearly shown.

Figure 1:
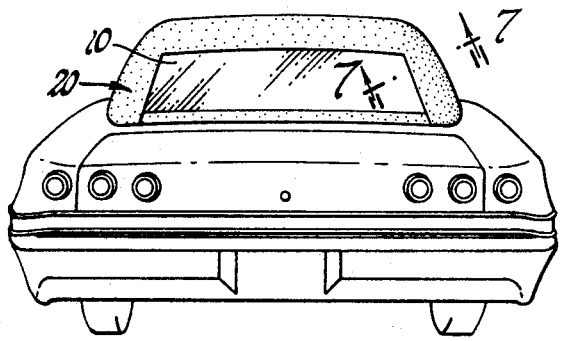
FIGURE 1 is a rear window of an automobile with a glass backlite installed.

In accordance with this invention convertible tops are prepared using a typical automobile safety glass which is tempered and in sheet form about ⅛″ thick. It may be desirable to wipe the surface of the glass clean before any polysulfide rubber is applied to the glass.

The polysulfide rubber used in our invention is prepared from polyalkylene polysulfides having mercaptan terminal and side groups capable of further polymerization and cross linkage. Normally polyalkylene polysulfides are available as viscous liquids and require further formulation to adapt them for production use.

Suitable polysulfide rubbers may be formed by the general reaction:

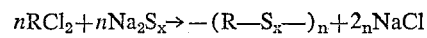

$$n\text{RCl}_2 + n\text{Na}_2\text{S}_x \rightarrow -(\text{R}-\text{S}_x-)_n + 2n\text{NaCl}$$

where R is an aliphatic group. The physical properties of the materials depend on the length of the aliphatic group and the number of sulfur atoms present. With four sulfurs per monomer all products are rubbery, whereas with only two sulfurs present one must have at least four methylene groups in the dihalide to obtain elastomeric properties. The halides ordinarily used are ethylene dichloride, B,B′-dichloroethyl ether, and bis(2-chloroethyl) formal. Thiokol LP32 is a liquid polysulfide polymer suitable for use in this invention which has a molecular weight of about 4,000. It is prepared by condensing with an alkali polysulfide 99.5 mole percent of bis(2-chloroethyl) formal and 0.5 mole percent of trichloropropane. The structural formula of the polymer is considered to be:

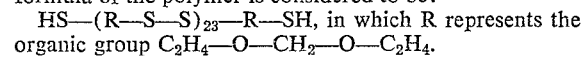

HS—(R—S—S)$_{23}$—R—SH, in which R represents the organic group $C_2H_4$—O—$CH_2$—O—$C_2H_4$.

It is a poly functional polymer having reactive mercaptan terminal and side groups so that in the presence of suitable oxidizing agents, such as lead dioxide, manganese dioxide, and various organic peroxides, it polymerizes and crosslinks to a rubber-like consistency.

As these curing agents are operable even at room temperatures, it is normally desirable to prepare the curing agents and polysulfide in separate formulations. The liquid polysulfide polymer preferably is formulated with carbon black, as a reinforcing filler, one or more thixotropic agents, such as precipitated silica, hydrous aluminum silicate, or a fatty amine silicate. In addition, a solvent such as toluene may be added to adjust the viscosity. In accordance with our invention a typical polysulfide formulation comprises 100 parts polyalkylene polysulfide (Thiokol LP32), 30 parts carbon black, 4 parts precipitated silica, and 4 parts toluene.

Lead dioxide finds frequent application as a curing agent for this type of rubber. In the curing agent portion of the formulation, lead dioxide is frequently mixed with a plasticizer such as dibutyl phthalate and filler materials such as calcined clay or precipitated calcium carbonate. It may also be desirable to add a curing retarder such as lead stearate. A specific example of a curing formulation suitable for use in the process of this invention comprises 40 parts lead dioxide in powder form, 25 parts dibutyl phthalate, 3 parts lead stearate and 10 parts each of calcined clay and precipitated calcium carbonate.

Figure 2:
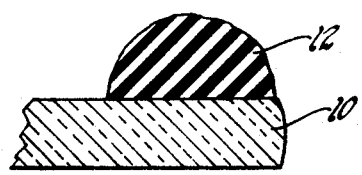
FIGURE 2 is a section taken on line 7—7 of FIGURE 1 showing the glass with polysulfide bonding material applied.

In the application of the curable polysulfied layer to the glass, 10 parts of the above polysulfide formulation and 1 part of the above lead dioxide formulation are thoroughly blended and applied to that portion of the glass window to which it is desired to bond the convertible top material. In FIGURE 2 the polysulfide rubber 12 is shown on the glass 10. The dark viscous mixture is typically applied to the glass in a layer ⅛" to ¼" thick. The mixture cures in a few hours at room temperature or a few minutes in an oven at 300° F. After curing it is then trimmed to a uniform layer about ¹⁄₃₂" in thickness.

Figure 3:
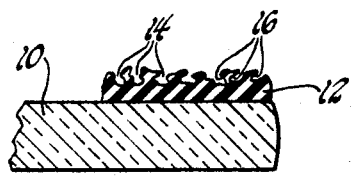
FIGURE 3 is a section similar to FIGURE 2 showing the polysulfide material after it is trimmed and mechanically abraded.
Figure 4:
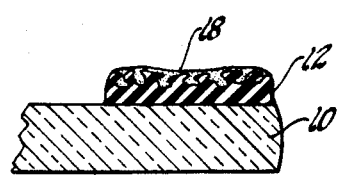
FIGURE 4 is a sectional view showing the abraded polysulfide material coated with a solution of 70% methyl ethyl ketone and 30% polyvinyl chloride.

As vinyl plastics and polysulfide rubbers are not particularly compatible bonding materials, it is necessary to prepare the polysulfide surface whereby a strong mechanical bond may be obtained between the vinyl plastic and the polysulfide rubber. In accordance with our invention this is accomplished by abrading the surface of the polysulfide rubber opposite that bonded to the glass. In FIGURE 3 the abraded surface 14 is shown. The abrasion is effected by any suitable abrasive material which is harder than the polysulfide surface. For example, a metal block having a large number of small sharp projections extending from its surface may be drawn back and forth over the polysulfide rubber. As a result of the abrading, preferably conducted lengthwise with respect to the polysulfide layer, crevices or interstices 14 are formed in the surface of the polysulfide layer 12. These crevices as shown in FIGURE 3 are irregular in cross section but in general have undercut sides 16. Thus, it may be seen that if the interstices are filled with a plastic resin which is subsequently cured, a strong mechanical bond may be obtained between such material and the polysulfide rubber. Furthermore, if this curable material is chemically compatible with the vinyl facing material of a convertible top, it may be cured in contact with the facing material to bond the convertible top to the polysulfide rubber and, thus, to the glass. Several different plastic materials may be used to bind the polyvinyl facing of the convertible top to the polysulfide layer 12. These include polyvinyl chloride, polyvinyl butyral, polyvinyl acetate, polyvinyl formal and other vinyl compatible polymers, such as vinylidene chloride and copolymers of butadiene, styrene, and acrylonitrile. Unplasticized low molecular weight resins of one of the above materials dissolved in a suitable organic solvent such as methyl ethyl ketone, acetone, diisobutyl ketone, cyclohexanone, tetrahydrofuran, toluene, xylene, and dimethyl formamide are applied to the abraded rubber. A specific example of a resin and solvent is a 30% by weight solution of polyvinyl chloride in methyl ethyl ketone. Such a solution is applied to the abraded surface 14 of the polysulfide rubber layer 12, and the solvent is allowed to evaporate. As shown in FIGURE 4 the polyvinyl chloride resin now forms a thin layer 18 which completely fills the interstices 14 of the polysulfide layer 12.

Figure 5:
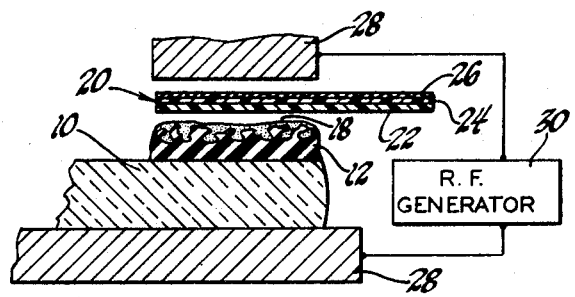
FIGURE 5 is a schematic sectional view showing the previously prepared glass and polysulfide material placed between the electrodes of a dielectric press. Positioned over the glass is the convertible top material consisting of a facing layer of polyvinyl chloride, an inner layer of butyl impregnated cloth and a cloth outer covering.

As shown in FIGURE 5, the convertible top material 20 typically is comprised of 3 layers, a vinyl facing material 22, such as polyvinyl chloride, an inner layer of butyl impregnated cloth 24, and a cloth outer covering 26. The top material 20 is assembled against the polysulfide rubber layer 12 such that the polyvinyl chloride layer 22 is against the polyvinyl chloride resin layer 18. To complete the bond between the convertible top 20 and the polysulfide rubber 12, heat and pressure is required to form a homogeneous mass between the respective vinyl materials. Any suitable means may be used. However, it has been found preferable to use dielectric heating means. Therefore, as shown in FIGURE 5, the whole assembly is placed between the electrodes 28 of a dielectric press (not shown). The dielectric press electrodes 28 are connected to a radio frequency generator 30.

Dielectric heating is a heating process whereby heat is developed internally in an electrical insulating workpiece by friction. Heating is accomplished by the rotation and oscillation of the atoms and molecules of the insulator and the materials contained therein under the influence of an alternating potential field. In general the more rapidly the voltage field alternates, the faster the molecular movement and the greater the amount of heat that is uniformly generated in the workpiece material.

In our invention the workpiece is the glass 10, the polysulfide rubber 12, the vinyl chloride resin layer 18, and convertible top material 20. Voltages in the range of 600 to 2000 are used in this application. The A.C. voltage frequency is in the 10–20 megacycle range, preferably about 15 megacycles. A pressure is simultaneously applied of about 200 to 600 p.s.i. preferably about 300 p.s.i. Sufficient heat is generated to obtain a temperature of about 250° F. to 350° F. as measured at the interface between the vinyl facing 22 and the polysulfide layer 12.

Figure 6:
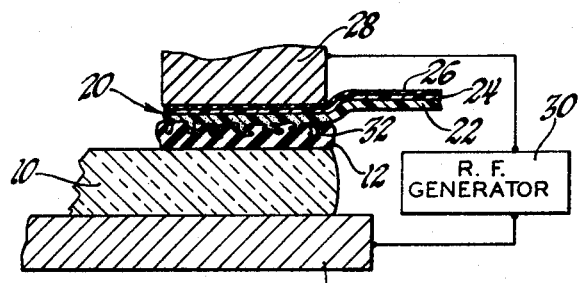
FIGURE 6 is a sectional view showing the dielectric press closed and the polyvinyl chloride materials heated into a homogeneous mass.
Figure 7:
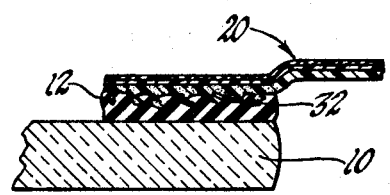
FIGURE 7 is a sectional view showing the bonded assembly with the plastic material mechanically locked to the polysulfide material.

The effect of this treatment is to fuse the vinyl chloride facing 22 and the vinyl chloride resin 18 into one homogeneous mass 32 as shown in FIGURE 6. Thus, the polyvinyl chloride facing of the convertible top is now extended into the interstices 14 of the polysulfide rubber layer 12. In this way the convertible top material 20 is mechanically bonded or locked to the polysulfide material 12 which is in turn bonded to the glass. In a normal application such bonds would be obtained on both sides of the glass window between the outer top material and the inner back curtain.

Although the bond between the polysulfide rubber and the glass is a strong, long-lasting bond, it is subject to attack and degradation by ultraviolet radiation after extended periods of time. The convertible top material overlaps the actual bond in this application and somewhat shades it from sunlight. However, it may be desirable to further guard against ultraviolet degradation of the glass-polysulfide rubber bond by the application of a thin silane film between the glass and the polysulfide. It is known that certain silanes form strong bonds with both glass and polysulfide rubber that resist ultraviolet degradation. A solution of a suitable silane, such as gamma amino propyl triethoxy silane, in water may be applied to the glass before the polysulfide rubber formulation is applied. The solvent is allowed to evaporate. Subsequently, the polysulfide rubber forms a strong bond with the silane which is not as vulnerable to ultraviolet radiation.

While this invention has been described in terms of a specific embodiment, it is obvious that other forms might be adopted by one skilled in the art and is to be limited only by the claims which follow.

What is claimed is:

1. A method of bonding a vinyl plastic material to glass using an abraded polysulfide rubber as a bonding means, said method comprised of forming a thin layer of polyalkylene polysulfide polymer formulation containing a curing agent to the surface of the glass; curing said polysulfide to a rubber whereby a bond is formed between one surface of said rubber layer and said glass surface; abrading the surface of said rubber layer opposite said glass surface whereby undercut crevices or interstices are formed therein; applying a solution of an unplasticized low molecular weight resin which is chemically compatible with vinyl polymers to said abraded rubber surface, whereby said undercut crevices or interstices are filled with said solution; removing said solvent by evaporation; applying said vinyl material against said abraded vinyl polymer compatible resin coated rubber surface; and applying heat and pressure to bond said vinyl material to said vinyl polymer compatible resin and thus to said polysulfide rubber layer and to said glass.

2. A method of bonding an automobile convertible top material having a vinyl facing to glass using an abraded polysulfide rubber as a bonding means, said method comprised of applying a thin layer of a polyalkylene polysulfide polymer formulation containing a curing agent to the surface of the glass; curing said polysulfide to a rubber whereby a bond is formed between one surface of said rubber layer and said glass surface; abrading the surface of said rubber layer opposite said glass surface, whereby undercut crevices or interstices are formed; applying a solution of an unplasticized low molecular weight thermoplastic vinyl resin to said abraded rubber surface, whereby said undercut crevices or interstices are filled with said solution, said vinyl resin being taken from the group consisting of polyvinyl chloride, polyvinyl butyral, polyvinyl formal, polyvinyl acetate and vinylidene chloride; removing said solvent by evaporation; pressing said vinyl facing of said convertible top material against said abraded coated rubber surface at a pressure of from about 200 p.s.i. to about 600 p.s.i.; and dielectrically heating said vinyl facing and said abraded coated rubber surface to a temperature of about 250° F. to 350° F. whereby said vinyl resin is fused to said vinyl facing material and a substantially mechanical bond is obtained between said vinyl facing material and said polysulfide rubber layer.

3. An article in which a vinyl plastic surface is bonded to a glass surface comprising a glass surface; a thin layer of polysulfide rubber bonded on one of its sides to said glass surface, the opposite side of said polysulfide layer being characterized by a plurality of undercut crevices or interstices; a thin layer of a cured unplasticized polymer, chemically compatible with vinyl plastics which covers said opposite surface of said polysulfide rubber and completely fills said undercut crevices whereby a mechanical bond is formed between said polymer and said polysulfide rubber; and a vinyl plastic surface which is chemically bonded to said polymer layer and thereby bonded to said glass surface.

4. An article as in claim 3 wherein said vinyl plastic compatible polymer is taken from the group consisting of polyvinyl chloride, polyvinyl butyral, polyvinyl formal, polyvinyl acetate and vinylidine chloride.

5. An automobile convertible top comprised of a glass rear window; a thin layer of polysulfide rubber bonded on one of its sides to said glass window, the opposite side of said polysulfide layer being characterized by a plurality of undercut crevices or interstices; a thin layer of a cured unplasticized polymer chemically compatible with vinyl plastics which covers said opposite surface of said polysulfide rubber and completely fills said undercut crevices whereby a mechanical bond is formed between said polymer and said polysulfide rubber; and a convertible top fabric material having a vinyl plastic layer which is chemically bonded to said unplasticized polymer layer.

6. A convertible top as in claim 5 wherein said vinyl plastic compatible polymer is taken from the group consisting of polyvinyl chloride, polyvinyl butyral, polyvinyl formal, polyvinyl acetate and vinylidine chloride.

References Cited

UNITED STATES PATENTS

| 2,466,963 | 4/1949 | Patrick et al. | 260—79.1 |
| 2,618,959 | 11/1952 | Watkins | 161—187 XR |
| 2,638,379 | 5/1953 | Spring | 161—37 XR |
| 3,247,138 | 4/1966 | Jorczak et al. | 260—18 |

OTHER REFERENCES

Carbide Technical Publication, Vinylite Rigid Sheet Plastics, pp. 18–21, 1944.

EARL M. BERGERT, *Primary Examiner.*

M. L. KATZ, *Assistant Examiner.*